(12) United States Patent
Wu

(10) Patent No.: US 12,342,962 B2
(45) Date of Patent: Jul. 1, 2025

(54) PEPPER MILL

(71) Applicant: YIENN LIH ENTERPRISE CO., LTD., Tainan (TW)

(72) Inventor: Ming-Feng Wu, Tainan (TW)

(73) Assignee: LENGJER METAL & PLASTIC CO., LTD, Dongguan (CN)

( * ) Notice: Subject to any disclaimer, the term of this patent is extended or adjusted under 35 U.S.C. 154(b) by 287 days.

(21) Appl. No.: 18/322,983

(22) Filed: May 24, 2023

(65) Prior Publication Data

US 2024/0074615 A1 Mar. 7, 2024

(30) Foreign Application Priority Data

Sep. 2, 2022 (TW) ................................. 111209615

(51) Int. Cl.
*A47J 42/04* (2006.01)
*A47J 42/08* (2006.01)

(52) U.S. Cl.
CPC ............... *A47J 42/04* (2013.01); *A47J 42/08* (2013.01)

(58) Field of Classification Search
CPC .................................. A47J 42/04; A47J 42/08
See application file for complete search history.

(56) References Cited

U.S. PATENT DOCUMENTS

| 7,377,458 B1 * | 5/2008 | Wu | A47J 42/50 |
| | | | 241/146 |
| 2011/0162538 A1 * | 7/2011 | Wu | A47J 42/04 |
| | | | 241/169.1 |

FOREIGN PATENT DOCUMENTS

GB 2502381 A * 11/2013 ............. A47J 42/04

* cited by examiner

*Primary Examiner* — Mohammed S. Alawadi
(74) *Attorney, Agent, or Firm* — MUNCY, GEISSLER, OLDS & LOWE, P.C.

(57) ABSTRACT

A pepper mill includes a receiving unit, a grinding unit, and an adjusting mechanism. The receiving unit includes a stationary seat and a rotatable seat. The grinding unit includes inner and outer grinding seats. The adjusting mechanism includes an operating base mounted in the rotatable seat and operable to rotate about a rotary axis, and a movable seat disposed between the operating base and the inner grinding seat. The operating base includes a threaded rod extending upwardly into and threadedly engaging the movable seat. The movable seat is connected co-rotatably to the rotatable seat, is movable with the inner grinding seat along the rotary axis, and is not rotatable relative to the rotatable seat. Rotation of the operating base drives the movable seat to move along the rotary axis under guidance of the rotatable seat, thereby driving the inner grinding seat to move along the rotary axis.

13 Claims, 11 Drawing Sheets

PEPPER MILL

CROSS-REFERENCE TO RELATED APPLICATION

This application claims priority to Taiwanese Utility Model Patent Application No. 111209615, filed on Sep. 2, 2022.

FIELD

The disclosure relates to a seasoning mill, and more particularly to a pepper mill.

BACKGROUND

Referring to FIGS. 1 and 2, a conventional pepper mill includes a main body 11, a connecting seat 12, a grinding device 13, a stationary seat 14, a rotatable seat 15, a movable seat 16, and a biasing member 17. The connecting seat 12 is connected to a lower portion of the main body 11, and includes a connecting shaft 121 that extends downwardly from a center portion thereof along an axis. The grinding device 13 is disposed in the stationary seat 14, and includes an outer grinding seat 131 that is connected fixedly to the stationary seat 14 and an inner grinding seat 132 that is sleeved on the connecting shaft 121, that is surrounded by the outer grinding seat 131, and that cooperates with the outer grinding seat 131 for grinding peppercorns retained therebetween. The stationary seat 14 is mounted to a lower portion of the connecting seat 12. The rotatable seat 15 is rotatably mounted to and disposed at a lower end of the stationary seat 14. The movable seat 16 is disposed in the stationary seat 14 and under the grinding device 13, and includes an external threaded rod threadedly engaging the rotatable seat 15. The biasing member 17 is sleeved on the connecting shaft 121 and is clamped between the center portion of the connecting seat 12 and a top surface of the inner grinding seat 132.

The stationary seat 14 includes a plurality of guiding grooves 141 that are formed in an inner surface thereof. The movable seat 16 includes a plurality of arms 161 that extend respectively into the guiding grooves 141 such that rotation of the rotatable seat 15 relative to the stationary seat 14 does not drive the movable seat 16 to rotate and drives the movable seat 16 to move along the axis under guidance of the stationary seat 14.

To adjust sizes of grains of ground peppercorns, the rotatable seat 15 is operated to rotate relative to the stationary seat 14 so the arms 161 of the movable seat 16 are driven to move respectively along guiding grooves 141 such that a size of a grinding space between the inner grinding seat 132 and the outer grinding seat 131 may be adjusted. When the movable seat 16 is moved upwardly, the inner grinding seat 132 disposed on the movable seat 16 is moved upwardly against a restoring force of the biasing member 17 and thus the grinding space is reduced. When the movable seat 16 is moved downwardly, the inner grinding seat 132 is biased by the restoring force of the biasing member 17 to move downwardly and thus the grinding space is increased. However, the biasing member 17 may lose elasticity over time so the grinding space may be changed and the sizes of grains of the ground peppercorns may be inconsistent.

SUMMARY

Therefore, an object of the disclosure is to provide a pepper mill that can alleviate at least one of the drawbacks of the prior art.

According to the disclosure, a pepper mill includes a receiving unit, a grinding unit, and an adjusting mechanism. The receiving unit includes a stationary seat, and a rotatable seat disposed under the stationary seat and rotatable relative to the stationary seat. The grinding unit includes an outer grinding seat mounted fixedly to the stationary seat, and an inner grinding seat surrounded by the outer grinding seat. The adjusting mechanism includes an operating base and a movable seat. The operating base is mounted in the rotatable seat and is operable to rotate about a rotary axis relative to the rotatable seat. The operating base includes an accessible portion that is adapted for access of a user, and a threaded rod that extends upwardly from the accessible portion along the rotary axis and that is rotatable about the rotary axis. The movable seat is disposed between the operating base and the inner grinding seat. The threaded rod extends into and threadedly engages the movable seat. The inner grinding seat is connected co-movably to the movable seat. The movable seat is connected co-rotatably to the rotatable seat, is movable along the rotary axis relative to the rotatable seat, and is not rotatable relative to the rotatable seat. Rotation of the rotatable seat relative to stationary seat drives, via the movable seat, rotation of the inner grinding seat relative to the outer grinding seat for grinding peppercorns retained between the inner and outer grinding seats. Rotation of the operating base about the rotary axis relative to the rotatable seat drives the movable seat to move along the rotary axis under guidance of the rotatable seat, thereby driving the inner grinding seat to move along the rotary axis relative to the outer grinding seat.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Figure 1:
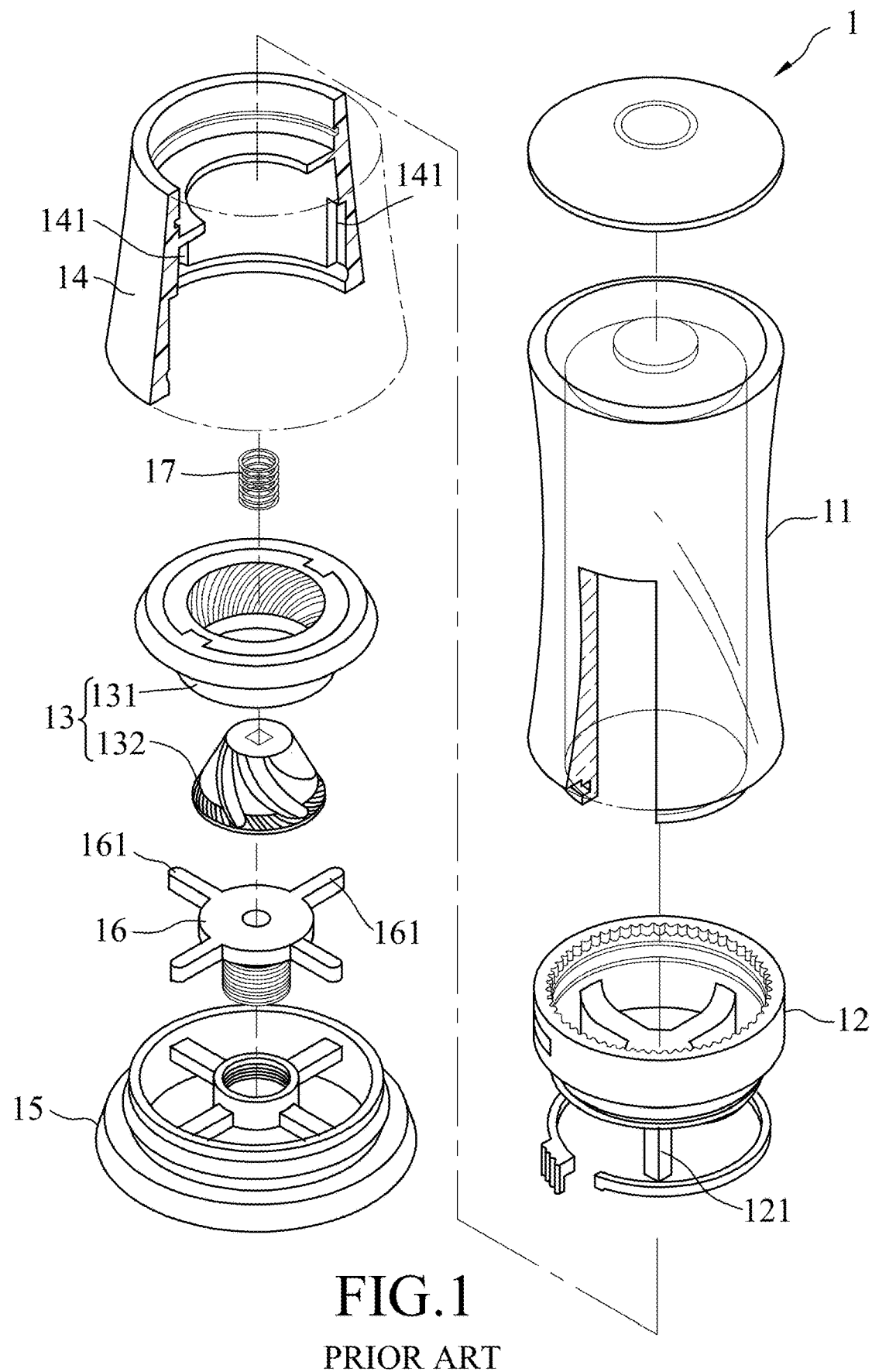
FIG. 1 is an exploded perspective view of a conventional pepper mill.
Figure 2:
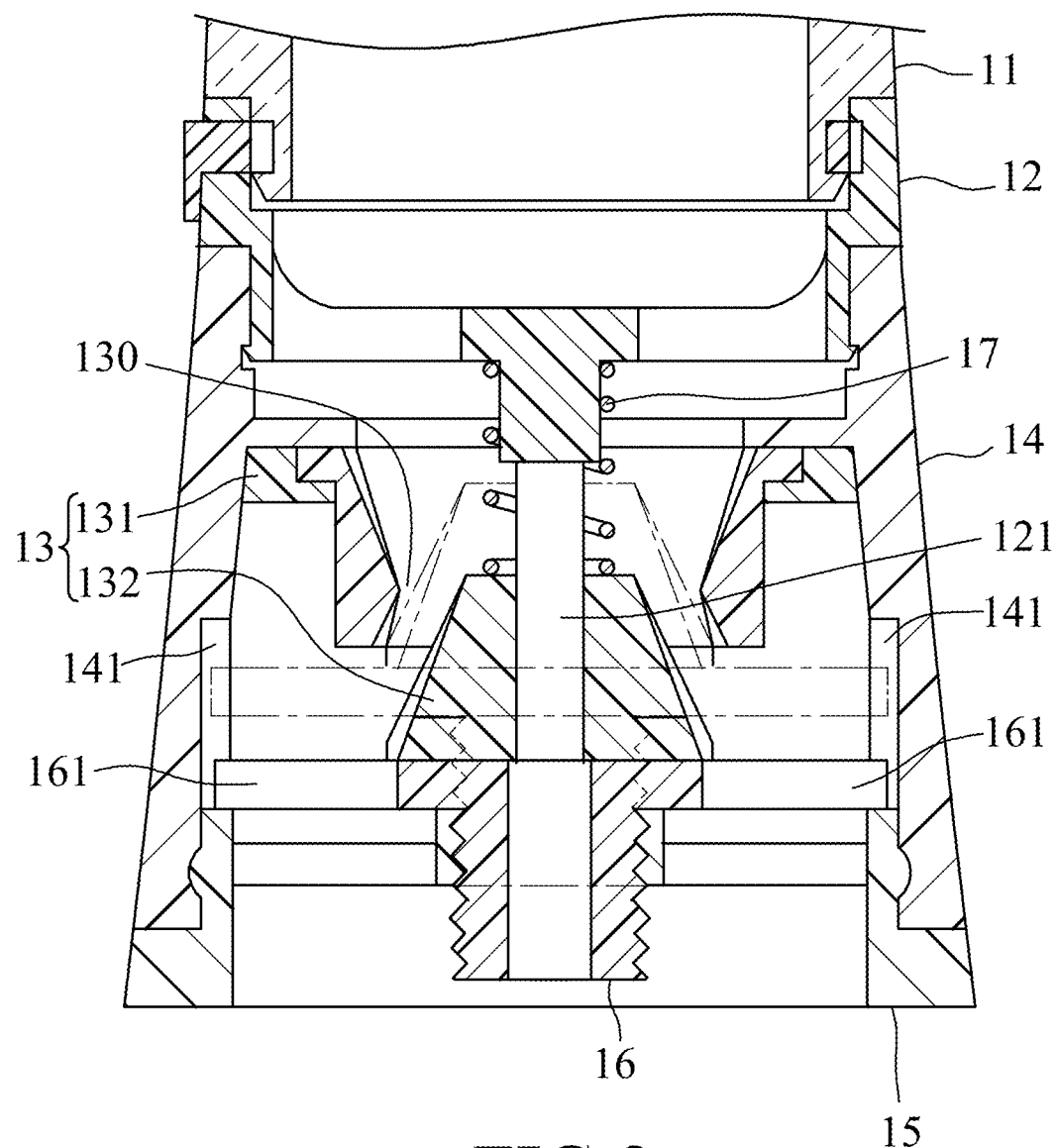
FIG. 2 is a fragmentary sectional view of the conventional pepper mill.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently e.g., rotated 90 degrees or at other orientations and the spatially relative terms used herein may be interpreted accordingly.

Figure 3:
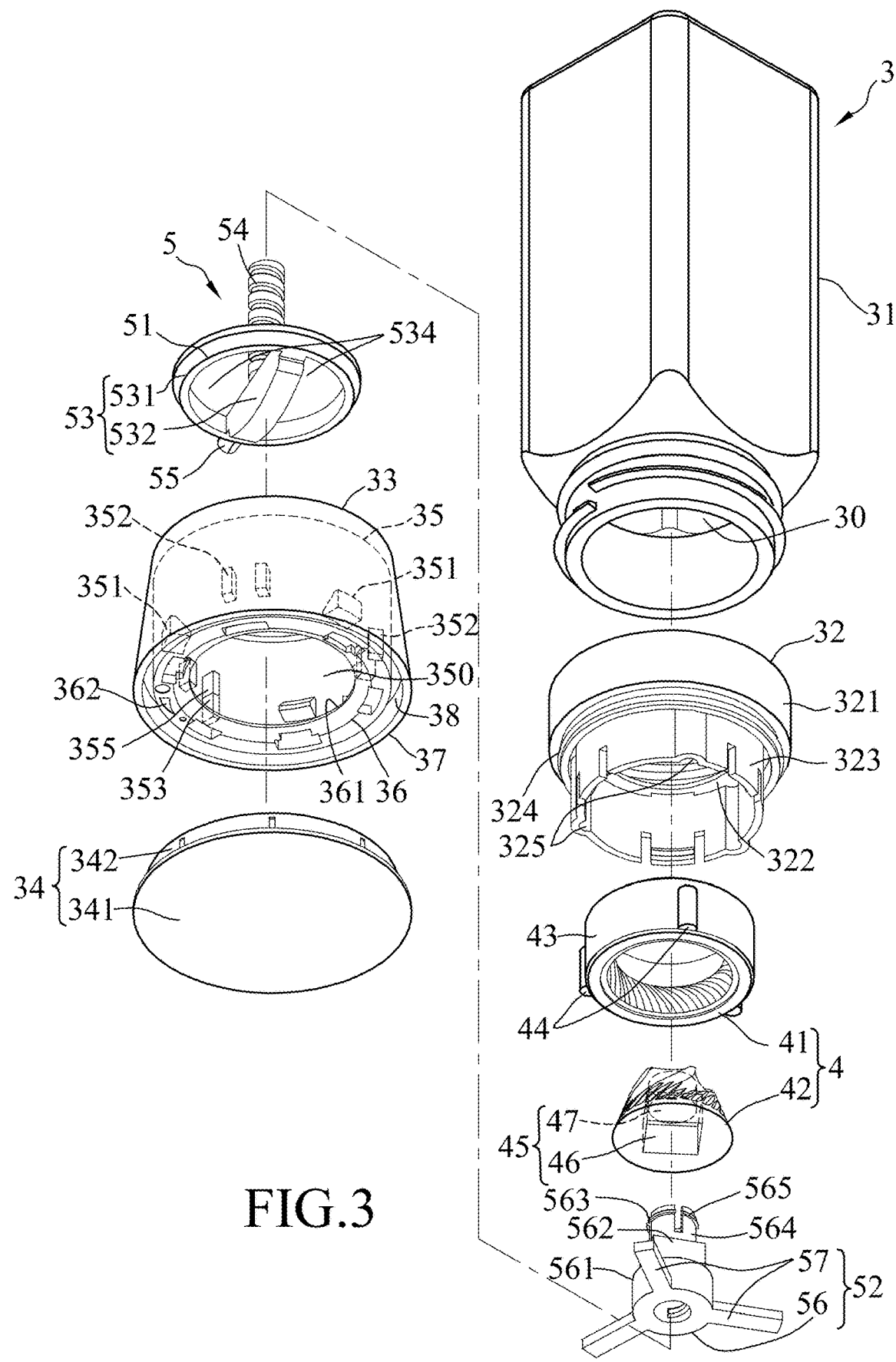
FIG. 3 is an exploded perspective view of a pepper mill according to a first embodiment of the present disclosure.
Figure 4:
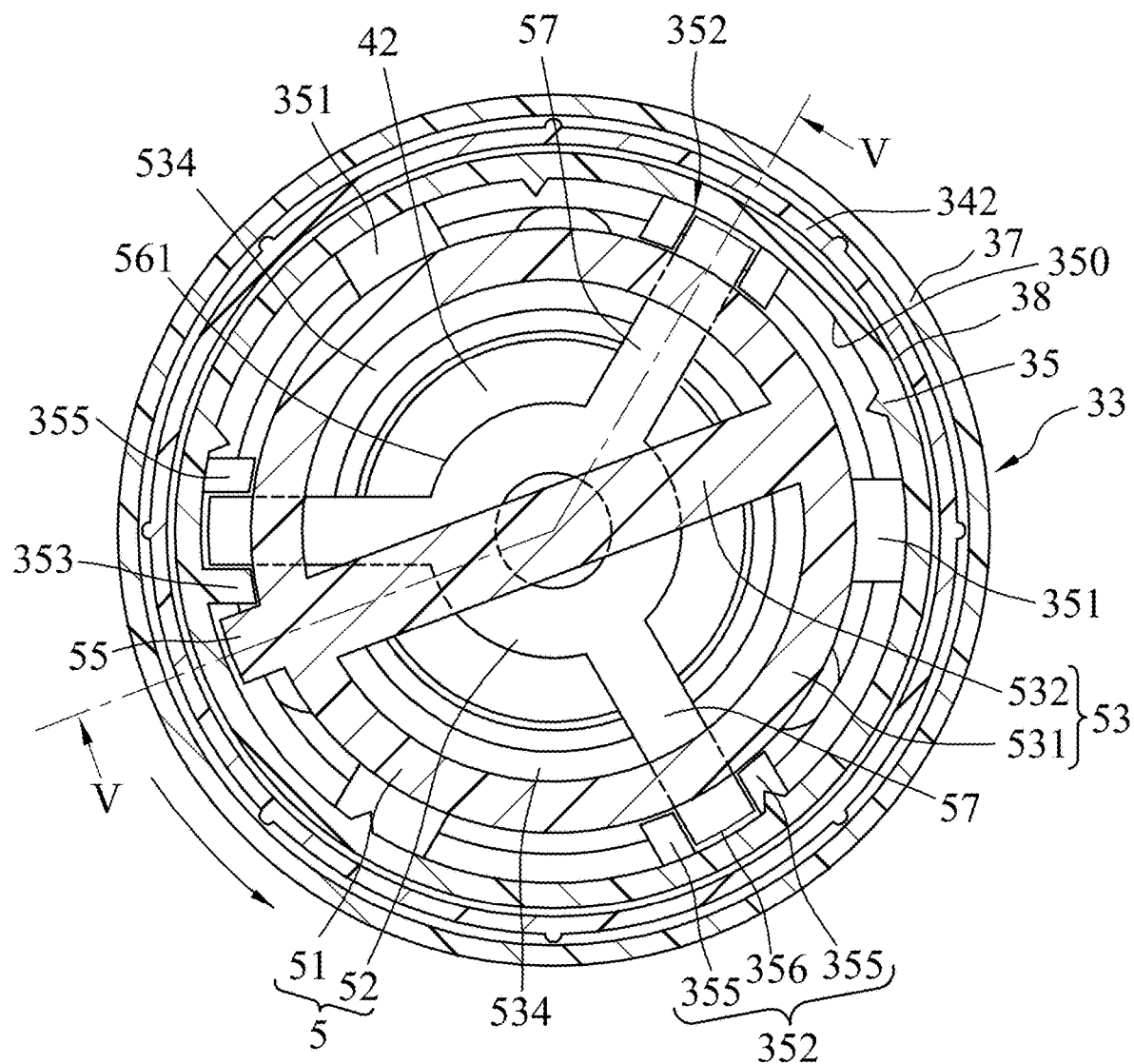
FIG. 4 is a cross sectional view of the first embodiment.
Figure 5:
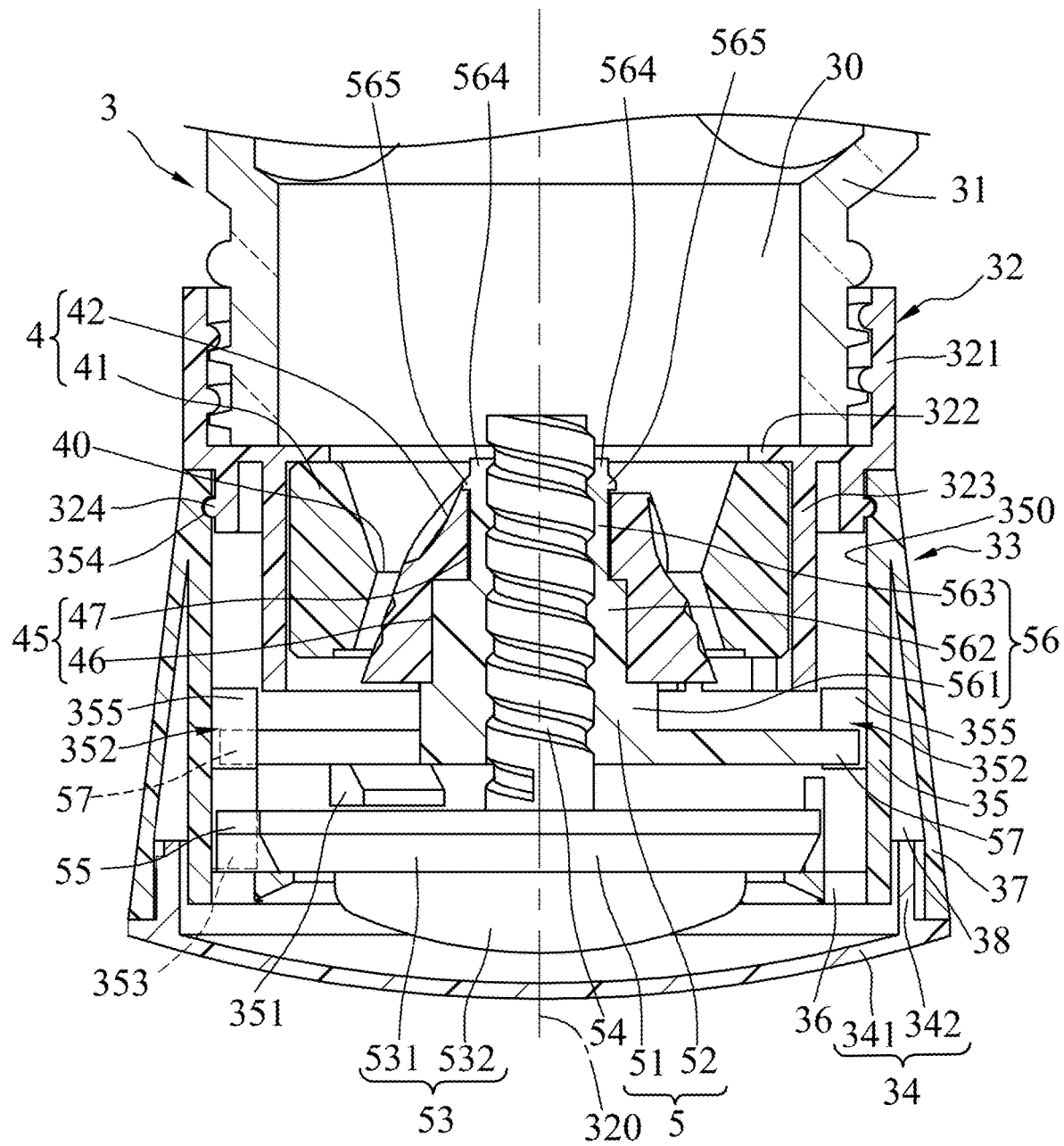
FIG. 5 is a fragmentary sectional view taken along line V-V in FIG. 4.

Referring to FIGS. 3 to 5, a first embodiment of a pepper mill of the present disclosure includes a receiving unit 3, a grinding unit 4 mounted to the receiving unit 3, and an adjusting mechanism 5 disposed in the receiving unit 3 and mounted to the receiving unit 3 and the grinding unit 4.

The receiving unit 3 includes a container body 31, a stationary seat 32, a rotatable seat 33, and a cover body 34. The container body 31 is disposed upright, defines an accommodating space 30 that is for containing peppercorns to be ground (not shown), and is detachably connected to the stationary seat 32. The rotatable seat 33 is disposed under the stationary seat 32 and is rotatable relative to the stationary seat 32. The cover body 34 is detachably connected to the rotatable seat 33, and has a cover portion 341 and a lock portion 342 that extends upwardly from the cover portion 341.

The stationary seat 32 includes an interconnecting surrounding wall 321, an annular wall 322, and an inner surrounding wall 323. The interconnecting surrounding wall 321 surrounds a rotary axis 320, is connected to the rotatable seat 33, engages threadedly and detachably the container body 31, and includes an annular flange 324 protruding from an outer surface of the interconnecting surrounding wall 321 and surrounding the rotary axis 320. The annular wall 322 extends inwardly from the interconnecting surrounding wall 321. The inner surrounding wall 323 extends downwardly from the annular wall 322 and has a plurality of first engaging portions 325 that are formed on an inner surface of the inner surrounding wall 323.

The rotatable seat 33 includes a first surrounding wall 35, a restraining wall 36, and a second surrounding wall 37. The first surrounding wall 35 has an inner surface 350 that surrounds the rotary axis 320. The restraining wall 36 extends inwardly from the inner surface 350 and defines an opening 361 permitting ground peppercorns to be dispensed from the container body 31. The second surrounding wall 37 extends outwardly and downwardly from an upper portion of the first surrounding wall 35, and cooperates with the first surrounding wall 35 to define a lock space 38. The lock portion 342 of the cover body 34 detachably engages the lock space 38 so as to close the opening 361.

The first surrounding wall 35 further has a plurality of limiting blocks 351 that extend from the inner surface 350, that are disposed above the restraining wall 36, and that are angularly spaced apart from one another, a plurality of guiding structures 352 that are formed on the inner surface 350, that are disposed above the limiting blocks 351, and that are angularly spaced apart from one another, and a stop block 353 that is formed on the inner surface 350 and that is disposed between the restraining wall 36 and the limiting blocks 351. Each of the guiding structures 352 further has two protruding ribs 355 that are formed on the inner surface 350, that extend in a direction of the rotary axis 320, that are angularly spaced apart from each other, and that cooperate with the inner surface 350 to define a guiding groove 356 extending in the direction of the rotary axis 320 thereamong. The inner surface 350 of the first surrounding wall 35 is formed with an annular groove 354 that is disposed in an upper portion of the first surrounding wall 35 and that rotatably engages the annular flange 324 of the interconnecting surrounding wall 321 of the stationary seat 32.

The grinding unit 4 includes an outer grinding seat 41 mounted fixedly to the stationary seat 32, and an inner grinding seat 42 surrounded by the outer grinding seat 41. The grinding unit 4 has a grinding space 40 formed between the outer grinding seat 41 and the inner grinding seat 42 for retaining peppercorns disposed therebetween.

The outer grinding seat 41 includes a seat portion 43 and a plurality of second engaging portions 44. The seat portion 43 is surrounded by the inner surrounding wall 323 of the stationary seat 32 and has a top end that abuts against the annular wall 322. The second engaging portions 44 are formed on an outer surface of the seat portion 43 and respectively engage the first engaging portions 325.

It should be noted that, in this embodiment, each of the first engaging portions 325 is an elongated groove extending in the direction of the rotary axis 320, and the respective one of the second engaging portions 44 is a rib extending in the direction of the rotary axis 320 and engaging the first engaging portion 325. In other embodiments, each of the first engaging portions 325 may be a rib, and the respective one of the engaging portions 44 is an elongated groove engaging the first engaging portion 325.

The inner grinding seat 42 has a through hole 45 extending therethrough along the rotary axis and having a large hole portion 46 that is non-circular, and a small hole portion 47 that is disposed above and that is in spatial communication with the large hole portion 46. In this embodiment, the large hole portion 46 is rectangular and the small hole portion 47 is circular.

The adjusting mechanism 5 includes an operating base 51 mounted in the rotatable seat 33 and operable to rotatable about the rotary axis 320 relative to the rotatable seat 33, and a movable seat 52 disposed between the operating base 51 and the inner grinding seat 42. Specifically, the operating base 51 includes an accessible portion 53, a threaded rod 54, and a protrusion 55. The accessible portion 53 is adapted for access of a user and includes an annular ring 531 and an elongated block 532. The annular ring 531 of the accessible portion 53 is restrained between the restraining wall 36 and the limiting blocks 351. The elongated block 532 is disposed on a diameter of the annular ring 531, is connected to an inner peripheral surface of the annular ring 531, and cooperates with the inner peripheral surface of the annular ring 531 to defines two holes 534 that are in spatial communication with the opening 361 of the restraining wall 36 so the peppercorns ground by the grinding unit 4 are permitted to first be dispensed from the container body 31, and then pass through the holes 534 and the openings 361. The elongated block 532 is adapted to be grabbed and rotated by the user. The threaded rod 54 extends upwardly from the elongated block 532 of the accessible portion 53 along the rotary axis 320, extends into and threadedly engages the movable seat 52, and is rotatable about the rotary axis 320. The protrusion 55 extends transversely from a circumference of the annular ring 531 of the accessible portion 53. The stop block 353 of the first surrounding wall 35 limits the rotation of the operating base 51 relative to the rotatable seat 33 upon contact of the protrusion 55 with the stop block 353.

The movable seat 52 is connected co-rotatably to the rotatable seat 33, is movable along the rotary axis 320 relative to the rotatable seat 33, and is not rotatable relative to the rotatable seat 33. Specifically, the movable seat 52 includes a main portion 56 and a plurality of arm portions 57. The threaded rod 54 extends into and threadedly engages the main portion 56, and the inner grinding seat 42 is connected co-movably to main portion 56. The arm portions 57 extend outwardly from the main portion 56, and each of the arm portions 57 extends into the guiding groove 356 of a respective one of the guiding structures 352 such that the rotation of the operating base 51 about the rotary axis 320 relative to the rotatable seat 33 drives each of the arm portions 57 to move along the guiding groove 356 of the respective one of the guiding structures 352.

The main portion 56 of the movable seat 52 includes a connecting segment 561, a sleeved segment 562, and an engaging segment 563. The arm portions 57 extend outwardly from the connecting segment 561, and the threaded rod 54 extends into and threadedly engages the connecting segment 561. The sleeved segment 562 extends upwardly from the connecting segment 561 and non-rotatably engages the large hole portion 46. The engaging segment 563 extends upwardly from the sleeved portion 562 through the small hole portion 47 and secures the inner grinding seat 42 to limit movement of the inner grinding seat 42 relative to the movable seat 52. The engaging segment 563 includes a plurality of snap-fit portions 564 that extend through the small hole portion 47 and that are resiliently deformable, and a plurality of hooks 565 that extend outwardly and respectively from the snap-fit portions 564 and that abut against a top surface of the inner grinding seat 42.

It should be noted that, in this embodiment, the sleeved segment 562 is complementary in shape with the large hole portion 46. The configurations of the sleeved segment 562 and the large hole portion 46 are not limited to the example shown herein and may be modified to be triangular or have other shapes as long as the sleeved segment 562 non-rotatably engages the large hole portion 46.

To grind peppercorns, rotation of the rotatable seat 33 relative to stationary seat 32 drives, via the movable seat 52, rotation of the inner grinding seat 42 relative to the outer grinding seat 41 for grinding peppercorns retained in the grinding space 40. At this time, the stationary seat 32 and the outer grinding seat 41 remain unmoved so peppercorns retained in the grinding space 40 may be ground and first be dispensed from the container body 31 and then pass through the holes 534 and the openings 361.

Figure 6:
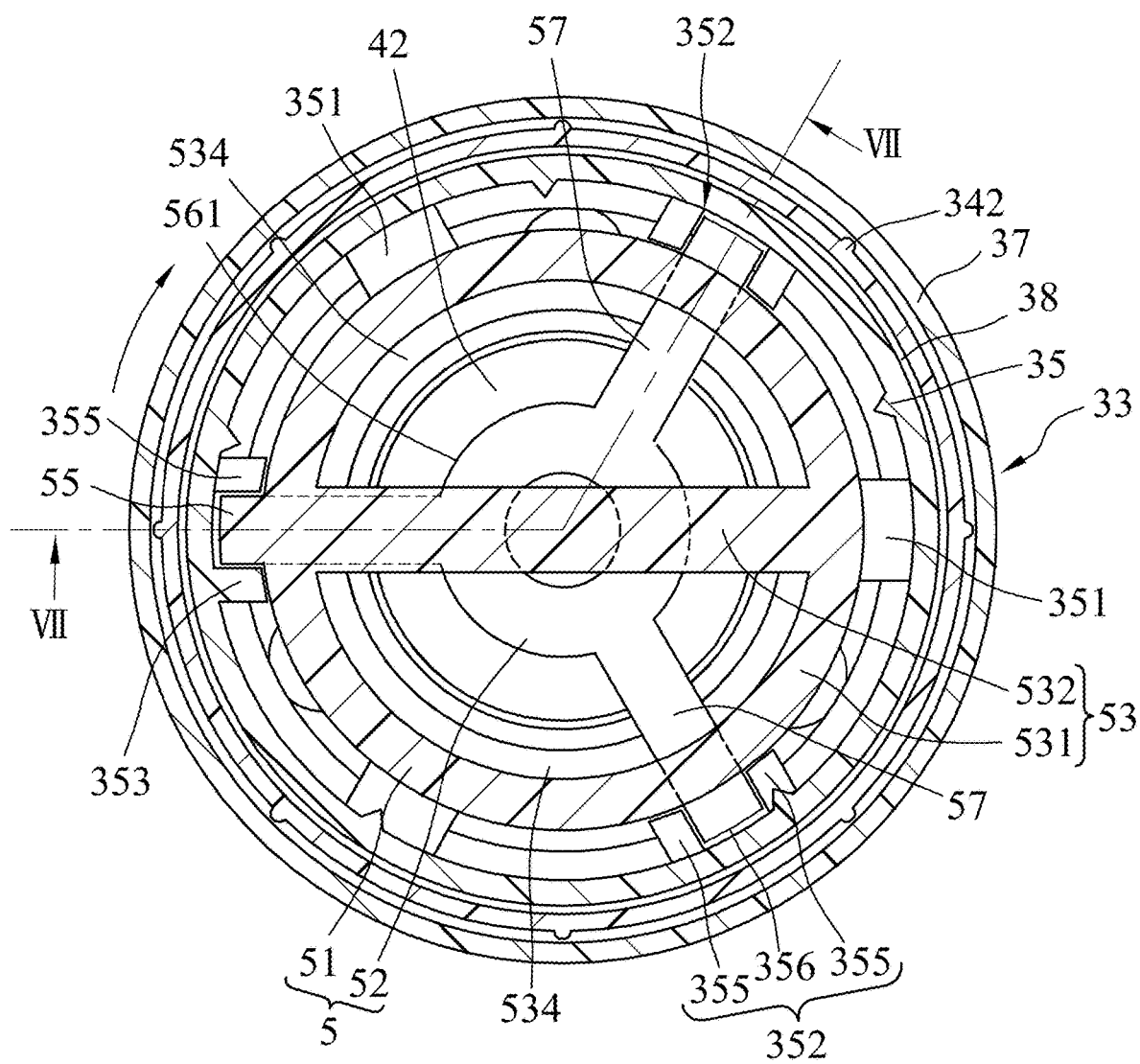
FIG. 6 is a cross sectional view similar to FIG. 4 but illustrating an operating base being rotated relative to a rotatable seat of the first embodiment.
Figure 7:
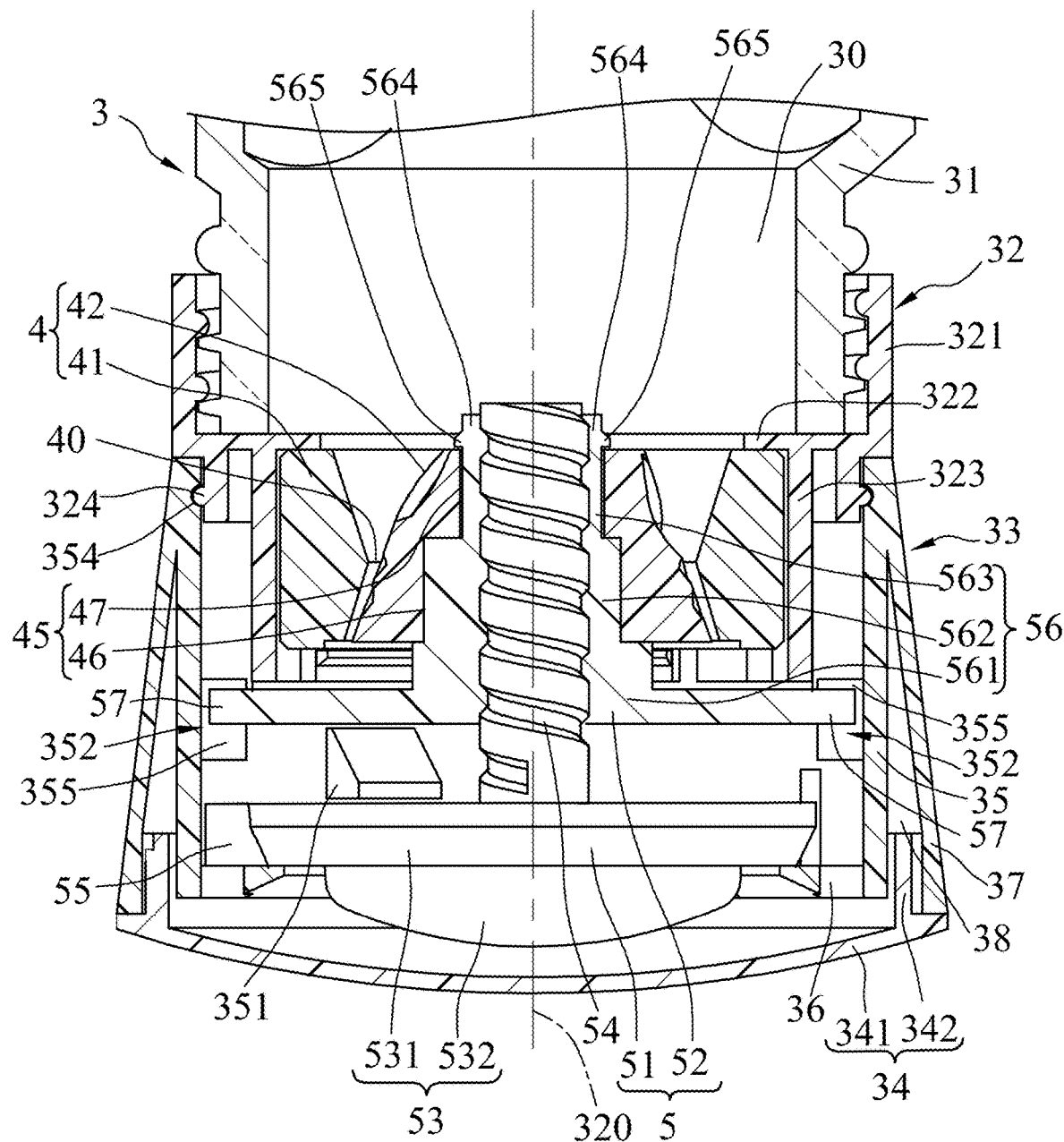
FIG. 7 is a fragmentary sectional view taken along line VII-VII in FIG. 6.

To adjust sizes of grains of the ground peppercorns, rotation of the operating base 51 about the rotary axis 320 relative to the rotatable seat 33 drives the movable seat 52 to move along the rotary axis 320 under guidance of the rotatable seat 33, thereby driving the inner grinding seat 42 to move along the rotary axis 320 relative to the outer grinding seat 41 so a size of the grinding space 40 may be adjusted. Referring to FIGS. 4 to 7, an example of how the sizes of grains of the ground peppercorns are adjusted is described. The elongated block 532 of the accessible portion 53 is first grabbed by the user and rotated from a position shown in FIG. 4 to FIG. 6, so the operating base 51 rotates about the rotary axis 320 relative to the rotatable seat 33 in a direction indicated by an arrow shown in FIG. 4. The movable seat 52 is driven to move upwardly under guidance of the arm portions 57 extending respectively into the guiding structures 352, thereby driving the inner grinding seat 42 to move along the rotary axis 320 toward the outer grinding seat 41. In this way, the size of the grinding space 40 shown in FIGS. 6 and 7 is reduced as compared to that shown in FIGS. 4 and 5, and the sizes of grains of the ground peppercorns are adjusted to be smaller.

Similarly, when the accessible portion 53 is operated from the position shown in FIG. 6 to FIG. 4, the inner grinding seat 42 is driven by the movable seat 52 to move away from the outer grinding seat 41 so the size of the grinding space 40 is increased and the sizes of grains of the ground peppercorns are adjusted to be larger.

It should be noted that the stop block 353 of the first surrounding wall 35 limits the rotation of the operating base 51 relative to the rotatable seat 33 upon contact of the protrusion 55 so the operating base 51 is allowed to be rotated relative to the rotatable seat 33 for almost a full circle. In this embodiment, the stop block 353 of the first surrounding wall 35 extends downwardly from one of the protruding ribs 355 of one of the guiding structures 352 but may be modified as long as the stop block 353 is able to limit the rotation of the operating base 51 relative to the rotatable seat 33 upon contact of the protrusion 55 therewith. Furthermore, in this embodiment, the guiding groove 356 of each of the guiding structures 352 is defined among the inner surface 350 and the protruding ribs 355 of a corresponding one of the guiding structures 352. In other embodiments, each of the guiding structures 352 may be modified to omit the protruding ribs 355 and the guiding groove 356 may be formed in the inner surface 350 of the first surrounding wall 35 as long as each of the arm portions 57 with an increased length is able to extend into the guiding groove 356 of the respective one of the guiding structures 352 so rotation of the operating base 51 relative to the rotatable seat 33 drives the movable seat 52 to move along the rotary axis 320, thereby driving the inner grinding seat 42 to move therewith.

Figure 8:
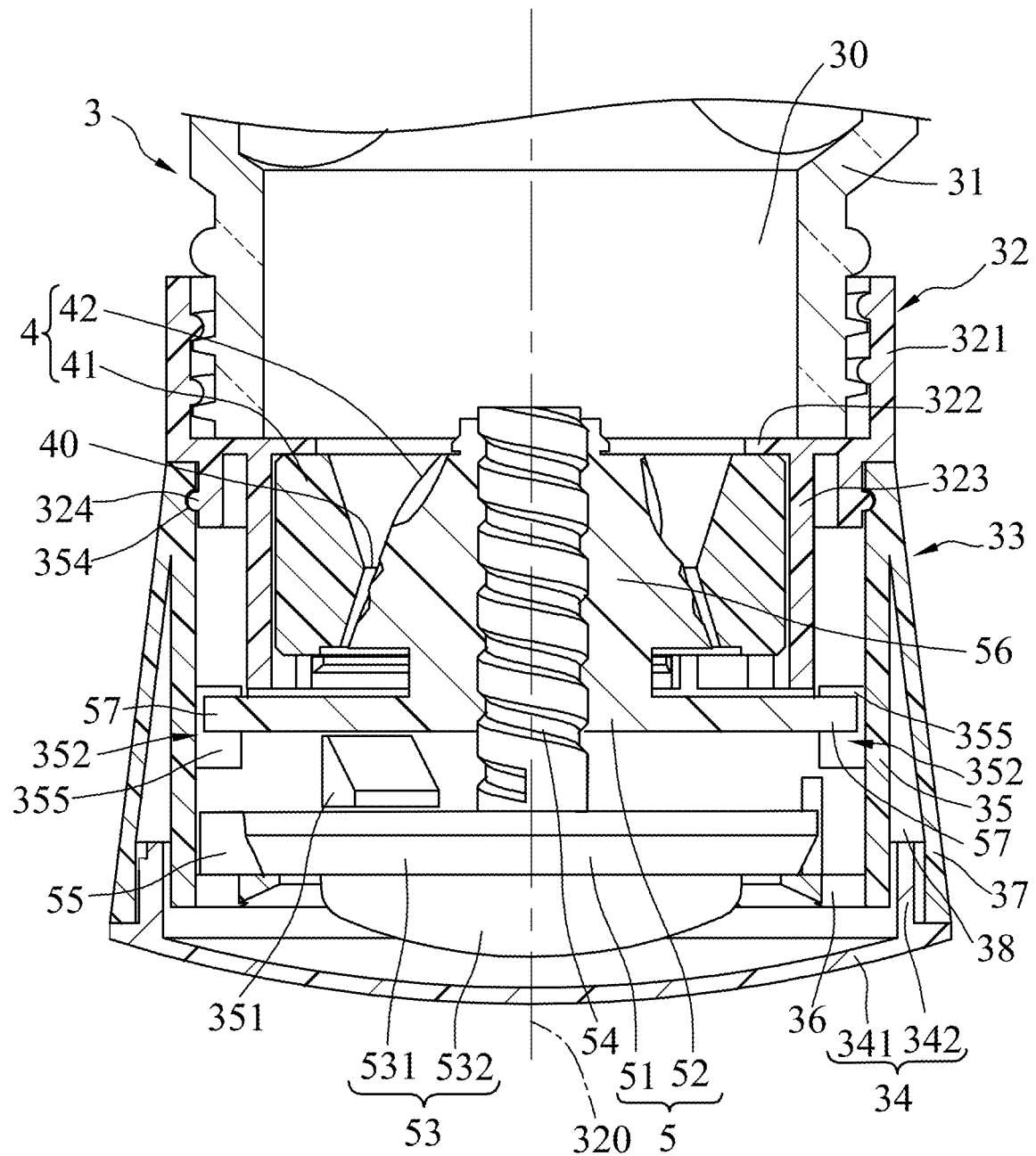
FIG. 8 is a fragmentary sectional view similar to FIG. 7 but illustrating a variation of the embodiment.

Additionally, in this embodiment, the inner grinding seat 42 and the outer grinding seat 41 are made of ceramic and the movable seat 52 is made of plastic. In a variation of the embodiment, the inner grinding seat 42, the outer grinding seat 41 and the movable seat 52 may be made of the same material, and the present disclosure is not limited to the materials described herein. In another variation of the embodiment, as shown in FIG. 8, the movable seat 52 and the inner grinding seat 42 may be molded as one piece.

Figure 9:
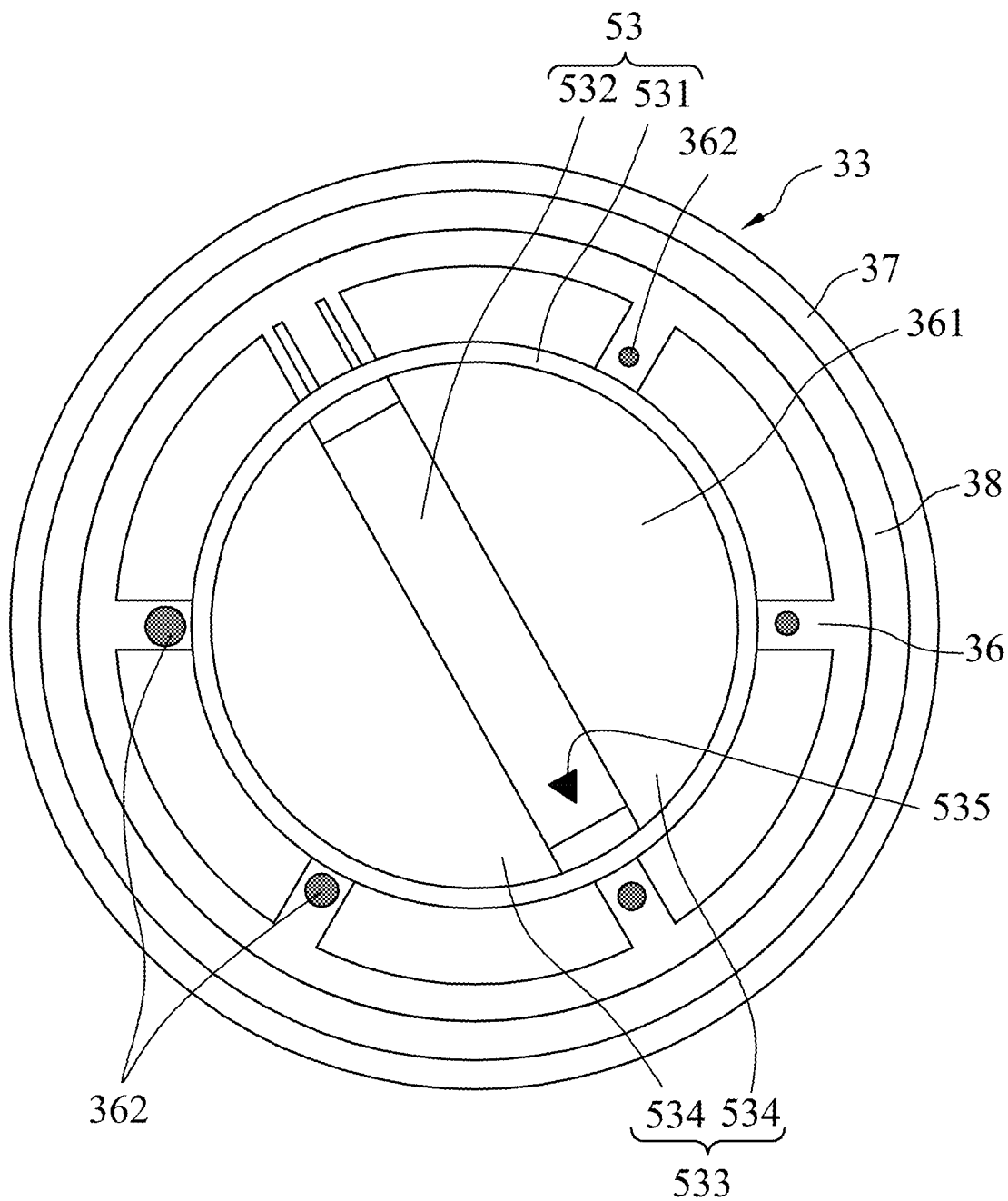
FIG. 9 is a bottom view of a variation of the first embodiment, illustrating the rotatable seat including a plurality of indicating symbols and the operating base including an indicating arrow for indicating sizes of grains of ground peppercorns.

It should be noted that, in this embodiment, the restraining wall 36 includes an indicating mark 362 formed on a bottom surface thereof and tapering along the restraining wall 36 to indicate the gradually decreasing sizes of grains of the ground peppercorns. In a variation of the first embodiment, as shown in FIG. 9, the restraining wall 36 includes a plurality of indicating marks 362 that are formed on the bottom surface thereof, that are equidistantly and angularly spaced apart from one another, and that are respectively presented by circles having different sizes to indicate different sizes of grains of the ground peppercorns. The elongated block 532 of the accessible portion 53 includes a triangle 535 that has a vertex pointing to and aligned with a selected one of the indicating marks 362 to indicate the sizes of grains of the ground peppercorns that are to be obtained.

Figure 10:
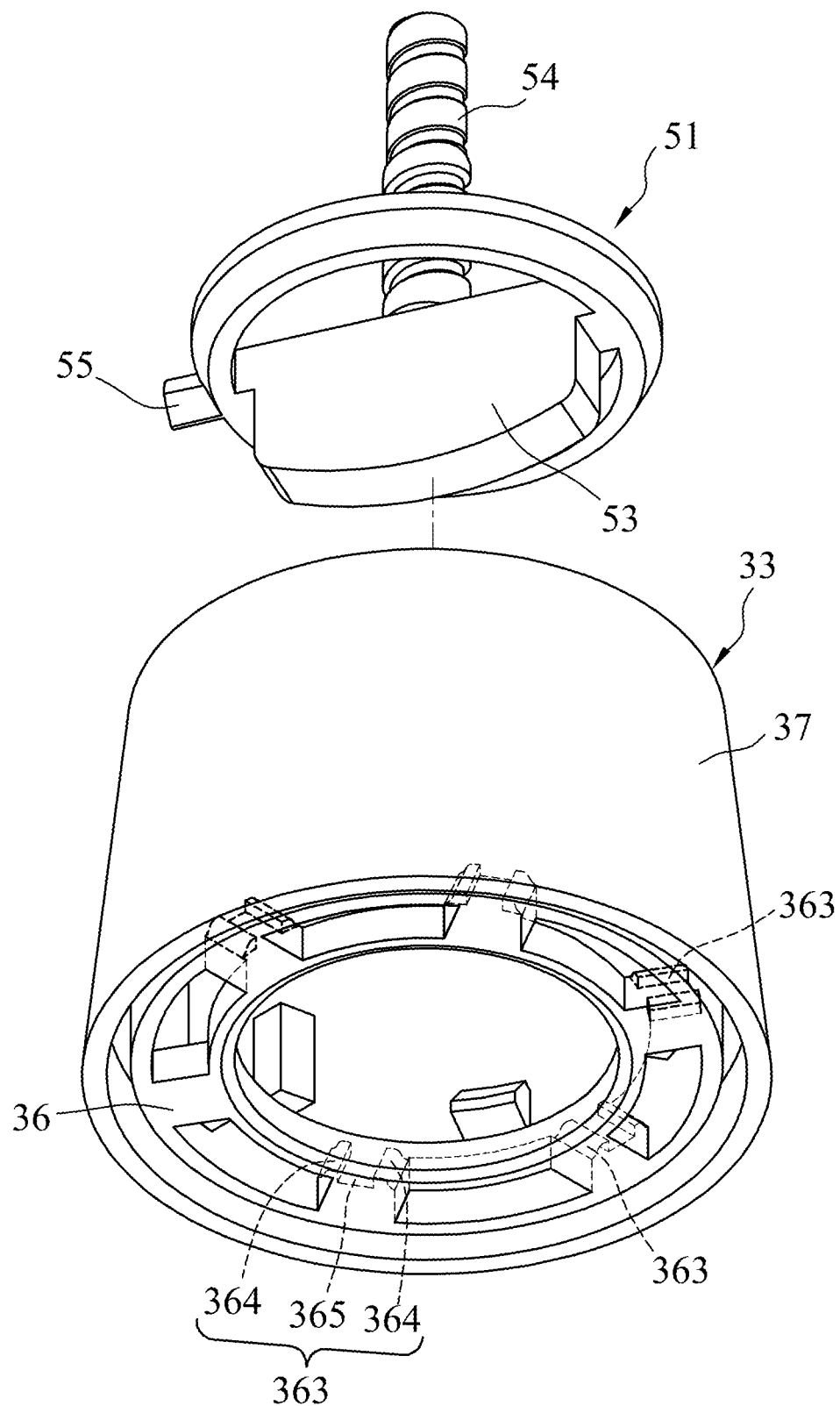
FIG. 10 is a fragmentary exploded perspective view of an operating base and a rotatable seat of a pepper mill according to a second embodiment of the present disclosure, illustrating the rotatable seat including a plurality of positioning structures.
Figure 11:
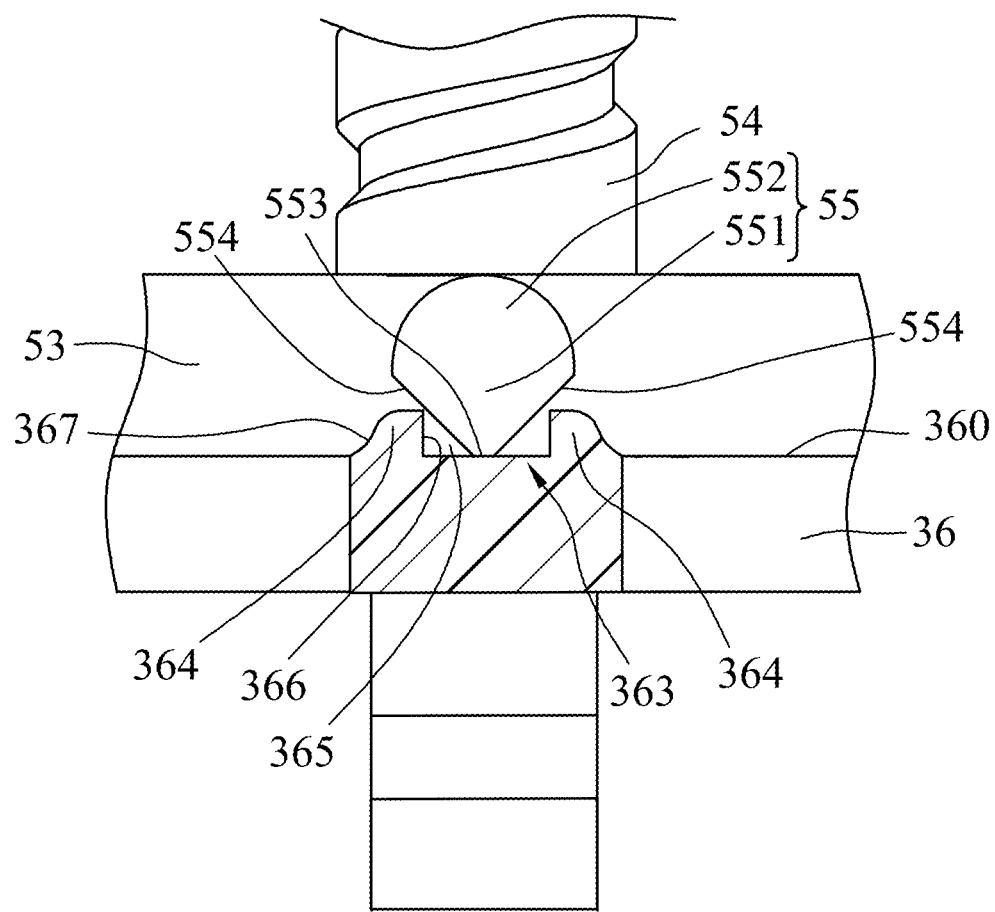
FIG. 11 is a fragmentary sectional view of the second embodiment, illustrating a protrusion of the operating base engaging one of the positioning structures.

Referring to FIGS. 10 to 11, a second embodiment of the pepper mill according to the present disclosure is shown. The second embodiment is similar to the first embodiment and the differences between the first and second embodiments reside in the configurations of the operating base 51 and the rotatable seat 33. For the sake of brevity, only the differences between the first and second embodiments will be described in the following description.

In the second embodiment, the restraining wall 36 has a top surface 360 that faces the grinding unit 4, and includes a plurality of positioning structures 363 that are formed on the top surface 360 and that are angularly spaced apart from one another. Specifically, each of the positioning structures 363 includes two ridge blocks 364 disposed on the top surface 360, angularly spaced apart from each other, and cooperating with the top surface 360 to define a positioning furrow 365 thereamong. Each of the ridge blocks 364 of the positioning structures 363 includes an upright surface 366 extending from the top surface 360 and facing the positioning furrow 365 of the positioning structure 363, and a curved guiding surface 367 extending from the upright surface 366 away from the positioning furrow 365 and downwardly to the top surface 360.

As shown in FIG. 11, the protrusion 55 of the operating base 51 includes an upper portion 552 and a lower portion 551 extending from the upper portion 552, tapering toward the top surface 360, detachably engaging the positioning furrow 365 of the selected one of the positioning structures 363, and having two inclined guided surfaces 554 with a distance between bottom ends thereof being smaller than that between top ends thereof.

When the user wishes to adjust the sizes of grains of the ground peppercorns, the operating base 51 is rotated so the protrusion 55 is rotated toward a selected one of the positioning structures 363. Then, the curved guiding surface 367 of one of the ridge blocks 364 of the selected one of the positioning structures 363 guides one of the inclined guided surface 554 of the lower portion 551 into the positioning furrow 365 of the selected one of the positioning structures 363 when the one of the inclined guided surfaces 554 is in sliding contact with the curved guiding surface 367 during rotation of the operating base 51. In this way, the operating base 51 is positioned relative to the rotatable seat 33. If the user keeps rotating the operating base 51 and exerts a rotational force greater than a resistive force between the lower portion 551 and the upright surface 366 of the other one of the ridge blocks 364 of the selected one of the positioning structures 363, the lower portion 551 would deform slightly and disengage from the positioning furrow 365. When this happens, the user may simply rotate the operating base 51 to another selected one of the positioning structures 363 to obtain different sizes of grains of the ground peppercorns. It should be noted that, in one embodiment, the positioning structures 363 are registered respectively with the indicating symbols 362 shown in FIG. 9 so as to enable the user to easily decide the desired size of grains of the ground peppercorns.

In sum, by virtue of the design of the inner grinding seat 42 and the movable seat 52, the inner grinding seat 42 is connected co-movably to the main portion 56 of the movable seat 52 along the rotary axis 320, so that the grinding space 40 formed between the outer grinding seat 41 and the inner grinding seat 42 is not changed during the grinding of the peppercorns retained therein. Furthermore, the structures of the connecting segment 561, the sleeved segment 562 and the engaging segment of the main portion 56 of the movable seat 52 that limit movement of the inner grinding seat 42 relative to the movable seat 52 also keep the grinding space 40 unchanged, thus keeping the sizes of grains of the ground peppercorns consistent. Additionally, the stop block 353 of the rotatable seat 33 limits rotation of the operating base 51 to less than one full circle relative to the rotatable seat 33 so the user may only adjust the sizes of grains of the ground peppercorns within a certain range.

Furthermore, by virtue of the structure of the operating base 51 being retained by the rotatable seat 33 so as to be unmovable along the rotary axis 320, rotation of the operating base 51 drives movement of the movable seat 52 along the rotary axis 320 under guidance of the rotatable seat 33, thereby driving the inner grinding seat 42 to move relative to the outer grinding seat 41 so the size of the grinding space 40 and thus the sizes of grains of the ground peppercorns are adjusted. Finally, the structures of the protrusion 55 and the positioning structures 363 described in the second embodiment may enable the user to be aware of a position of the operating base 51 relative to the rotatable seat 33 such that adjustment of the sizes of grains of the ground peppercorns becomes relatively simple.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A pepper mill comprising:
   a receiving unit that includes a stationary seat, and a rotatable seat disposed under said stationary seat and rotatable relative to said stationary seat;
   a grinding unit that includes an outer grinding seat mounted fixedly to said stationary seat, and an inner grinding seat surrounded by said outer grinding seat; and
   an adjusting mechanism that includes
      an operating base mounted in said rotatable seat and operable to rotate about a rotary axis relative to said rotatable seat, said operating base including an accessible portion that is adapted for access of a user, and a threaded rod that extends upwardly from said accessible portion along the rotary axis and that is rotatable about the rotary axis, and
      a movable seat disposed between said operating base and said inner grinding seat, said threaded rod extending into and threadedly engaging said movable seat, said inner grinding seat being connected co-movably to said movable seat;

wherein said movable seat is connected co-rotatably to said rotatable seat, is movable along the rotary axis relative to said rotatable seat, and is not rotatable relative to said rotatable seat;

wherein rotation of said rotatable seat relative to stationary seat drives, via said movable seat, rotation of said inner grinding seat relative to said outer grinding seat for grinding peppercorns retained between said inner and outer grinding seats; and wherein rotation of said operating base about the rotary axis relative to said rotatable seat drives said movable seat to move along the rotary axis under guidance of said rotatable seat, thereby driving said inner grinding seat to move along the rotary axis relative to said outer grinding seat.

2. The pepper mill as claimed in claim 1, wherein:

said rotatable seat includes a first surrounding wall having an inner surface that surrounds the rotary axis, and a plurality of guiding structures that are formed on said inner surface, each of said guiding structures having a guiding groove that extends in a direction of the rotary axis; and said movable seat includes a main portion threadedly engaging said threaded rod, said inner grinding seat being connected co-movably to said main portion and a plurality of arm portions extending outwardly from said main portion, each of said arm portions extending into said guiding groove of a respective one of said guiding structures such that the rotation of said operating base about the rotary axis relative to said rotatable seat drives each of said arm portions to move along said guiding groove of the respective one of said guiding structures.

3. The pepper mill as claimed in claim 2, wherein:

said inner grinding seat has a through hole extending therethrough along the rotary axis and having a large hole portion that is non-circular, and a small hole portion that is disposed above and in spatial communication with said large hole portion; and said main portion of said movable seat includes a connecting segment, said arm portions extending outwardly from said connecting segment, said threaded rod extending into and threadedly engaging said connecting segment, a sleeved segment extending upwardly from said connecting segment and non-rotatably engaging said large hole portion, and an engaging segment extending upwardly from said sleeved portion through said small hole portion and securing said inner grinding seat to limit movement of said inner grinding seat relative to said movable seat.

4. The pepper mill as claimed in claim 3, wherein said engaging segment includes a plurality of snap-fit portions that extend through said small hole portion and that are resiliently deformable, and a plurality of hooks that extend outwardly and respectively from said snap-fit portions and that abut against a top surface of said inner grinding seat.

5. The pepper mill as claimed in claim 2, wherein said each of said guiding structures further has two protruding ribs that are formed on said inner surface of said first surrounding wall, that extend in the direction of the rotary axis, that are angularly spaced apart from each other, and that cooperate with said inner surface to define said guiding groove thereamong.

6. The pepper mill as claimed in claim 2, wherein:

said rotatable seat further includes a restraining wall extending inwardly from said inner surface;

said first surrounding wall further has a plurality of limiting blocks extending from said inner surface and being disposed above said restraining wall; and said accessible portion of said operating base is restrained between said restraining wall and said limiting blocks.

7. The pepper mill as claimed in claim 6, wherein said operating base further includes a protrusion extending transversely from a circumference of said accessible portion, said first surrounding wall further having a stop block that is formed on said inner surface, and that limits the rotation of said operating base relative to said rotatable seat upon contact of said protrusion with said stop block.

8. The pepper mill as claimed in claim 7, wherein said restraining wall includes a plurality of positioning structures that are angularly spaced apart from one another, said protrusion of said operating base detachably engaging a selected one of said positioning structures during the rotation of said operating base relative to said rotatable seat.

9. The pepper mill as claimed in claim 8, wherein:

said restraining wall has a top surface facing said grinding unit; and each of said positioning structures includes two ridge blocks disposed on said top surface, angularly spaced apart from each other, and cooperating with said top surface to define a positioning furrow thereamong, said protrusion detachably engaging said positioning furrow of a selected one of said positioning structures.

10. The pepper mill as claimed in claim 9, wherein:

said protrusion of said operating base includes a lower portion tapering toward said top surface, detachably engaging said positioning furrow of the selected one of said positioning structures, and having two inclined guided surfaces with a distance between bottom ends thereof being smaller than that between top ends thereof; and each of said ridge blocks of said positioning structures includes an upright surface extending from said top surface and facing said positioning furrow of said positioning structure, and a curved guiding surface extending from said upright surface away from said positioning furrow and downwardly to said top surface, and guiding one of said inclined guided surfaces of said protrusion into said positioning furrow when the one of said inclined guided surfaces is in sliding contact with said curved guiding surface during the rotation of said operating base.

11. The pepper mill as claimed in claim 2, wherein:

said stationary seat includes an interconnecting surrounding wall connected to said rotatable seat, an annular wall extending inwardly from said interconnecting surrounding wall, and an inner surrounding wall extending downwardly from said annular wall and having a plurality of first engaging portions that are formed on an inner surface of said inner surrounding wall; and said outer grinding seat includes
- a seat portion surrounded by said inner surrounding wall and having a top end that abuts against said annular wall, and
- a plurality of second engaging portions formed on an outer surface of said seat portion and respectively engaging said first engaging portions.

12. The pepper mill as claimed in claim 2, wherein:

said receiving unit further includes
- a container body detachably connected to said stationary seat, and
- a cover body detachably connected to said rotatable seat and having a cover portion and a lock portion that extends upwardly from said cover portion; and said rotatable seat further includes a second surrounding wall extending outwardly and downwardly from an upper portion of said first surrounding wall, and cooperating with said first surrounding wall to define a lock space, said lock portion of said cover body detachably engaging said lock space.

13. The pepper mill as claimed in claim 1, wherein said movable seat and said inner grinding seat are molded as one piece.

* * * * *